(12) United States Patent
Esfandiari et al.

(10) Patent No.: US 6,687,682 B1
(45) Date of Patent: Feb. 3, 2004

(54) SYSTEM FOR DISCOUNTING IN A BIDDING PROCESS BASED ON QUALITY OF SERVICE

(75) Inventors: Babak Esfandiari, Ottawa (CA); Michael Weiss, Ottawa (CA)

(73) Assignee: Mitel Corporation, Ontario (CA)

( * ) Notice: Subject to any disclaimer, the term of this patent is extended or adjusted under 35 U.S.C. 154(b) by 0 days.

(21) Appl. No.: 09/435,857

(22) Filed: Nov. 8, 1999

(30) Foreign Application Priority Data

Nov. 9, 1998 (GB) .............................................. 9824567

(51) Int. Cl.[7] .............................................. G06F 17/60
(52) U.S. Cl. .......................................... 705/37; 379/114
(58) Field of Search ............................. 379/139; 705/8, 705/37; 709/202, 317

(56) References Cited

U.S. PATENT DOCUMENTS

| | | | |
|---|---|---|---|
| 5,440,739 A | 8/1995 | Beck et al. | 709/221 |
| 5,579,467 A | 11/1996 | Capps | 707/507 |
| 5,675,636 A * | 10/1997 | Gray | 379/114 |
| 5,774,656 A | 6/1998 | Hattori et al. | 395/200.06 |
| 5,802,502 A * | 9/1998 | Gell et al. | 379/114.1 |

FOREIGN PATENT DOCUMENTS

| | | |
|---|---|---|
| GB | 2311689 | 10/1997 |
| WO | 97/29443 | 8/1997 |

OTHER PUBLICATIONS

Herbert Lindasy, Walking the High Wire, American City and Country v10n98, Jul. 1994, pp 39–46.*

* cited by examiner

Primary Examiner—Vincent Millin
Assistant Examiner—Charles R. Kyle
(74) Attorney, Agent, or Firm—Staas & Halsey

(57) ABSTRACT

A multi-agent system for selecting a service based on competing bids, comprising a Bid Manager agent for issuing a call for bids, receiving the bids and selecting a best bid from among the received bids taking into consideration Quality of Service, and a plurality of Bidder agents for issuing the bids in response to the call for bids, wherein one of the Bidder agents issues the best bid and provides the service upon selection of the best bid by the Bid Manager.

3 Claims, 5 Drawing Sheets

US 6,687,682 B1

SYSTEM FOR DISCOUNTING IN A BIDDING PROCESS BASED ON QUALITY OF SERVICE

FIELD OF THE INVENTION

The present invention relates in general to multi-agent systems and more particularly to a system for taking into account the Quality of Service (QoS) of a bidder agent when quantifying the value of a bid for providing services.

BACKGROUND OF THE INVENTION

Telecommunication systems have recently been designed for providing a variety of real-time services and features in an open distributed environment through the collaboration of a set of software components called agents. Such multi-agent systems are designed in such a way that they may adapt and evolve in the face of changing environments. One such multi-agent system is known as MANA (Multi-Agent Architecture for Networking Applications) developed by Mitel Corporation. Through the use of a distributed agent architecture, the system meets high reliability levels and adapts to accommodate technological or service evolution. To achieve these goals, intelligence or learning mechanisms are provided to update service information derived from the operation of the agents. This information is used to redefine the agents and to reallocate resources for correcting failures and to meet the requirements of a defined service more precisely.

An application or service in a multi-agent system is mapped as a series of calls amongst agents to perform the service. Each agent specifies its type, quantity and quality of service (QoS) in order to provide for an overall application. Since multi-agent systems are implemented in an open environment, no agent has prior knowledge of any other agent. The only knowledge that an agent possesses is its requirements and capabilities to provide a specific type of service. Thus, an agent may be required to find other agents to fulfill certain of its service requirements. A calling agent (referred to herein as a Bid Manager) sends out a bid for services to a plurality of called agents (referred to herein as Bidders), each of whom may be capable of providing the necessary resources for the Bid Manager to complete its task. The Bid Manager receives and evaluates the bids from the various Bidders and selects the agent which has the best chance of success in performing the requested service. This is referred to herein as selecting the "lowest bid".

One example of a classic bidding mechanism of the foregoing type is disclosed in commonly owned U.S. Pat. No. 5,675,636 entitled Adaptive Method of Allocating Calls.

A problem with multi-agent bidding systems, such as discussed above, is that QoS is not normally taken into consideration in evaluating bids from the bidding agents. Thus, whereas a certain resource (e.g. long distance carrier) may present a low bid in terms of actual cost per call, it may suffer from undesirable bandwidth restrictions or failure rates which are not reflected in the bid. A Bid Manager may be well advised to enter into a contract with another Bidder which presents a higher cost bid but whose QoS is significantly higher.

SUMMARY OF THE INVENTION

According to the present invention, a system is provided for automatically monitoring and learning the QoS of each Bidder and incorporating the QoS into the cost of the bids (i.e. a poor performance leads to a lesser value of the bid).

BRIEF DESCRIPTION OF THE DRAWINGS

An embodiment of the invention is described herein below with reference to the accompanying drawings, in which.

DETAILED DESCRIPTION OF THE PREFERRED EMBODIMENT

The Figures and description herein of a preferred embodiment of the invention follow the ODP (Open Distributed Processing) principle of viewpoints (ITU-T Recommendations X901 to X905|ISO/IEC 10746), and use UML (Unified Modeling Language hypertext transfer protocol at world wide web.rational.com/uml object-oriented methodology notations.

Figure 1:
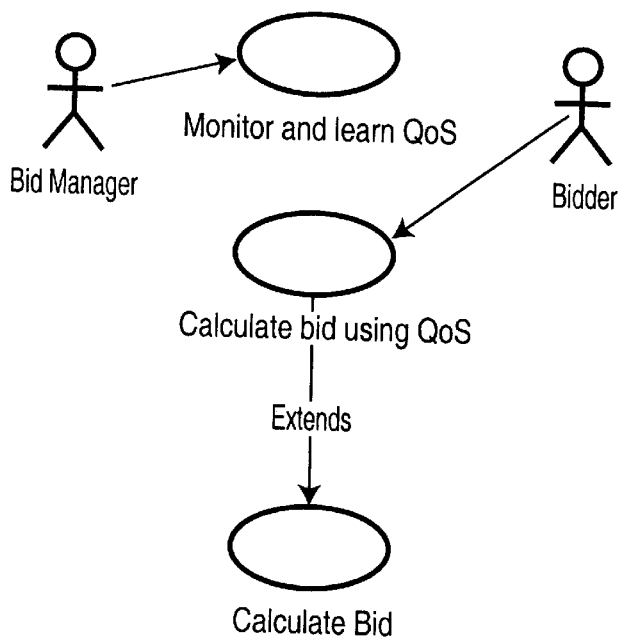
FIG. 1 is a use case diagram showing use of the system by various external actors.
Figure 2:
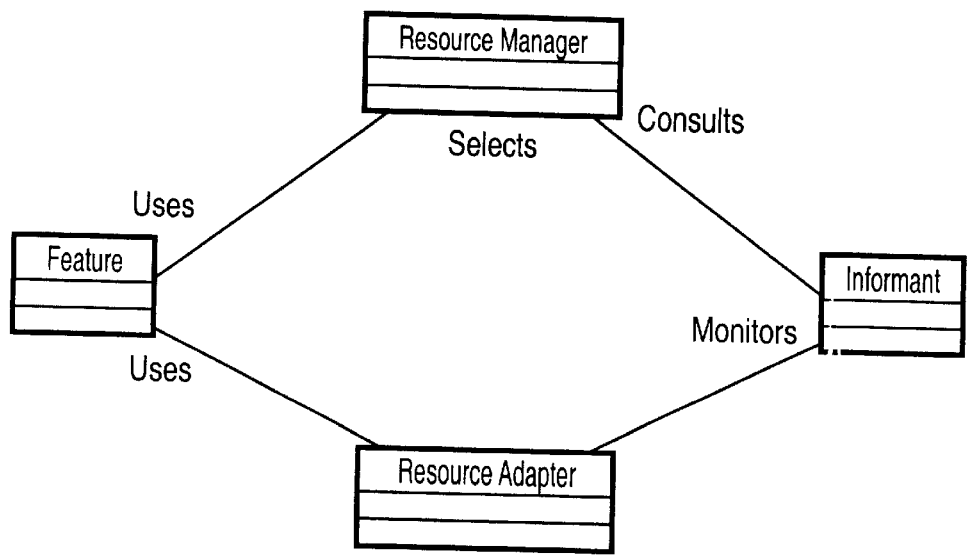
FIG. 2 is a class diagram showing the internal representation of an agent in general terms.

Turning to FIG. 2, which represents an enterprise viewpoint of the system, a plurality of Actors and Use Cases are shown, as follows:

Actors

The Bid Manager: The Bid Manager is a software agent that calls for bids and selects the best bid from a plurality of Bidders. An example of a Bid Manager in U.S. Pat. No. 5,675,636 is the assessment agent.

The Bidder: The Bidder is a software agent that, upon receipt of a call for a bid, sends a bid for a given service that it would provide if it is selected. An example of a Bidder in U.S. Pat. No. 5,675,636 is the costing agent.

Use Cases

Monitor and learn QoS: This use case starts when a given selected Bidder has finished offering its service. The Bid Manager assesses the quality of service and either:

1—returns the QoS to the selected Bidder as feedback; or
2—stores the QoS in a database for later use in modifying the value of subsequently received bids from the Bidder according to past performance. In this case, the Bid Manager is also able to learn (i.e. extract more general information) out of the database of previous QoS, which can be used to disregard further bids from a particular Bidder if the Bidder's performance is particularly poor.

Calculate bid using QoS: This use case starts when the Bidder receives a call for bid. The Bidder alters the classic calculation of the bid by taking into account the QoS feedback received from the Bid Manager. In the event that the Bid Manager does not send any QoS feedback, the Bidder simply calculates the bid in a classical way, such as described in U.S. Pat. No. 5,675,636, and the Bid Manager is responsible for modifying the bid value by taking into account the previously stored QoS information for the particular Bidder.

Calculate bid: As discussed above, U.S. Pat. No. 5,675,636 provides a description of how to calculate a bid in the particular context of least cost routing.

Turning to FIG. 2, a class diagram is provided comprising a general representation of the information viewpoint of the system, with emphasis on the resource management and selection aspects. The class diagram includes a class for ResourceManager, ResourceAdapter, Feature and Informant, as follows:

Classes

The Feature class represents a portion of the logic of an agent. It uses the ResourceManager to select Resource-Adapters to trigger actions on its environment.

The ResourceManager class manages a set of ResourceAdapters, and is responsible for selecting them. In order to do so, the ResourceAdapter may consult an Informant.

The ResourceAdapter is a class that provides a uniform interface to access APIs of resources.

The Informant is an optional class entity for monitoring the use and the performance of a given selected Resource-Adapter. It can thereby help the ResourceManager in its selection process by providing a history of its use, or even a learned pattern of its behavior.

Figure 2A:
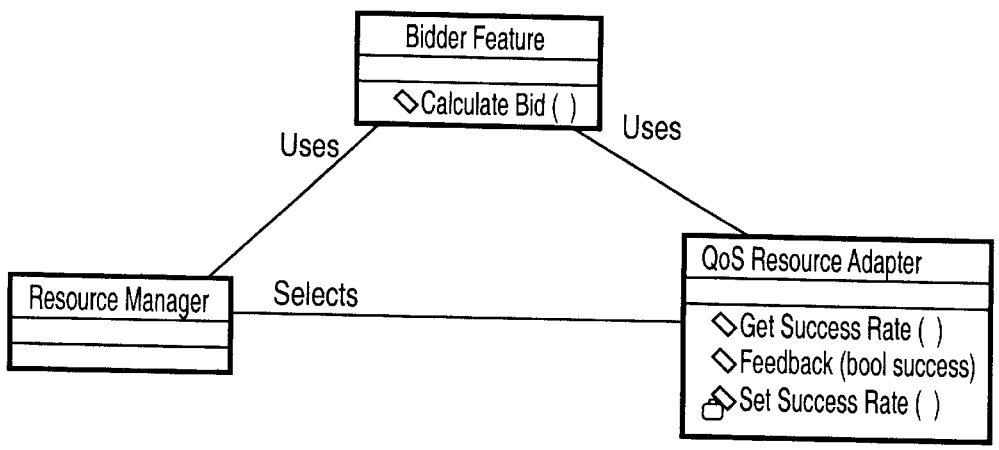
FIG. 2A is a class diagram of a Bidder agent according to the representation of FIG. 2.
Figure 2B:
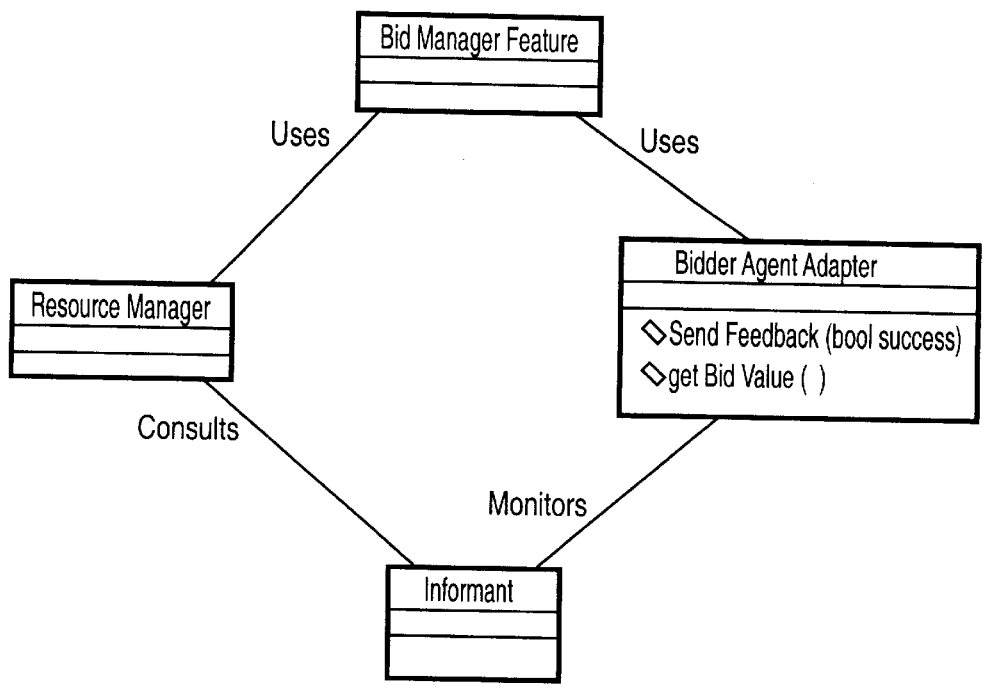
FIG. 2B is a class diagram of a Bid Manager agent according to the representation of FIG. 2.

Turning to FIGS. 2A and 2B, the general class design of FIG. 2 is applied to the particular cases of the Bidder and the Bid Manager, respectively.

In FIG. 2A, the BidderFeature accesses the success rate of a given ResourceAdapter with QoS properties for use in the calculation of a bid. This class also sends QoS feedback to the ResourceAdapter for modifying its success rate based on the success or failure of the last usage. The QoSResource-Adapter is a particular type of ResourceAdapter that contains notions of Quality of Service. Based on feedback concerning success or failure of a given operation, it calculates a SuccessRate( ) that is accessible to the feature, which can then be used to alter the calculation of a bid.

In FIG. 2B, the BidManagerFeature receives bid values from the Bidders (using a BidderAgentAdapter) in order to select the best service. Once the service has been completed, the BidManagerFeature sends feedback to the selected Bidder (via the BidderAgentAdapter) concerning the quality of provided service. The BidderAgentAdapter is an interface for communicating with the Bidder and using its services. The Quality of Service (QoS) of the BidderAgent can then be monitored by an Informant.

Figure 3A:
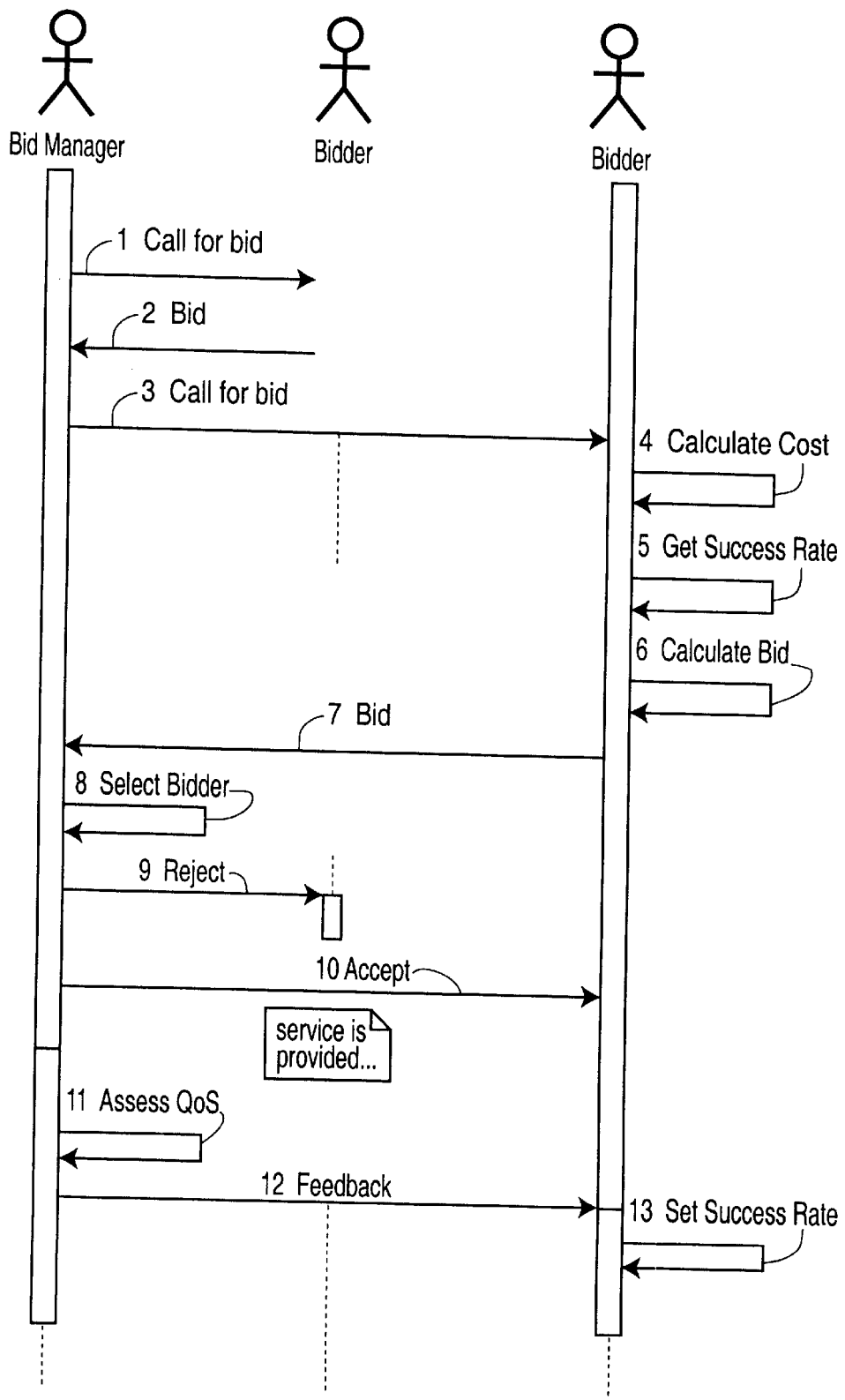
FIG. 3A is an interaction diagram showing a system according to the present invention where cost discounting is effected by each Bidder.
Figure 3B:
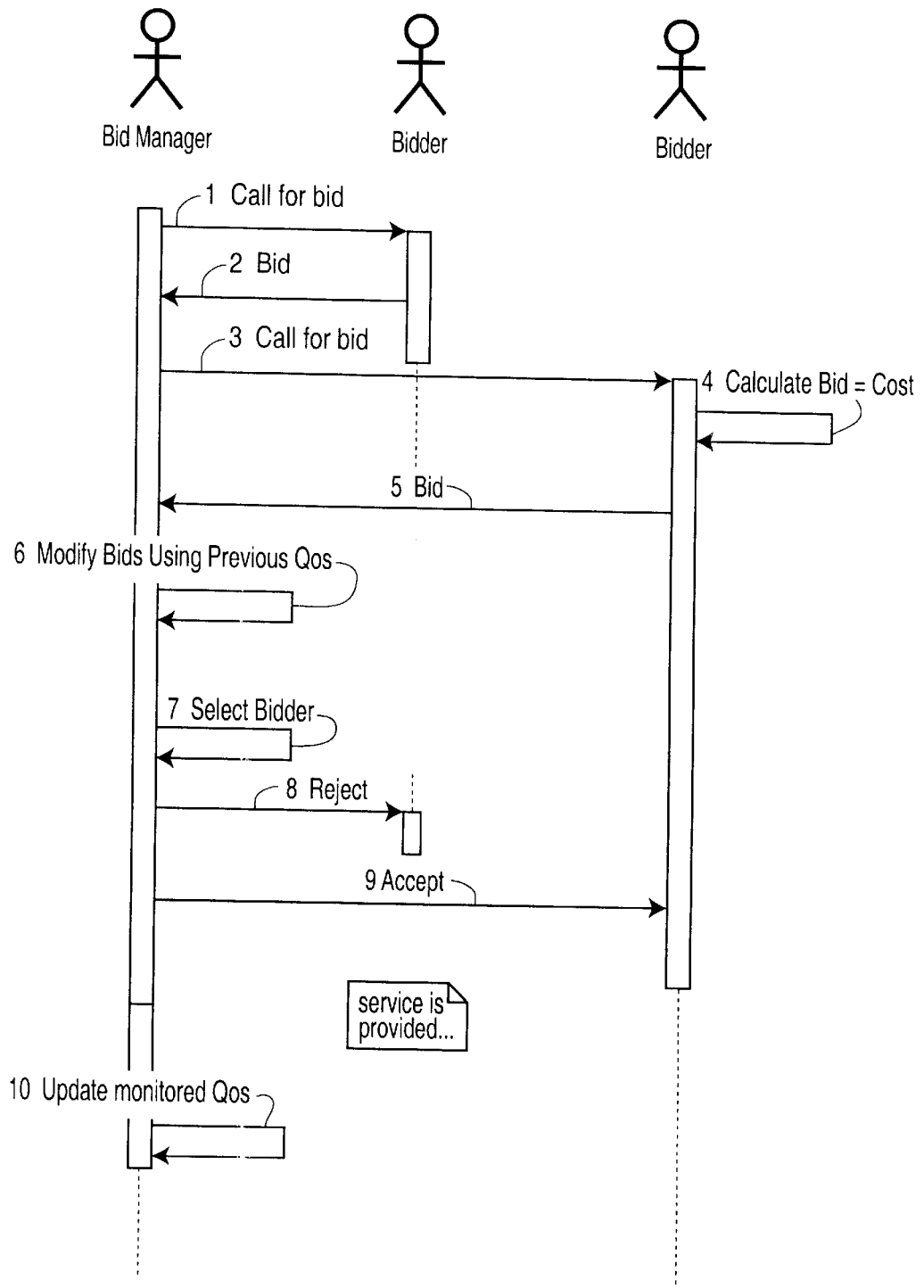
FIG. 3B is an interaction diagram showing a system according to an alternative embodiment of the present invention where cost discounting is effected by the Bid Manager using Informants to store information about the Bidders.

Turning to FIGS. 3A and 3B, interaction diagrams are provided for two scenarios. FIG. 3A illustrates the case where the discounting is done on the Bidder side. FIG. 3B illustrates the case when the discounting is done on the Bid Manager side using Informants to store information about Bidders, in which case there is no requirement to send QoS feedback to the Bidder.

In the scenario of FIG. 3A, the BidManager relies on the Bidders to provide a bid value that takes the QoS into account. Therefore the BidManager needs to send feedback to the selected bidder (step 12) after the service has been provided so that the Bidder can calculate the new value of its bid for the next time (step 13—setSuccessRate).

In the scenario of FIG. 3B, the BidManager monitors the QoS of the Bidders. Therefore it does not need to send feedback to them.

There are two calculations involved in the discounting method of the present invention: assessment of the current Quality of Service of a given Bidder, and the use of that value in the calculation of the bid.

With respect to the first calculation, the simplest assessment of QoS is the success rate of the provided service. The success rate is calculated from received QoS feedback concerning the most recent usage and information about past usage (such as previous success rates, how many times the service has been requested, etc.) Different calculation methods are possible, such as simple averaging, exponential averaging, etc.

Figure 4:
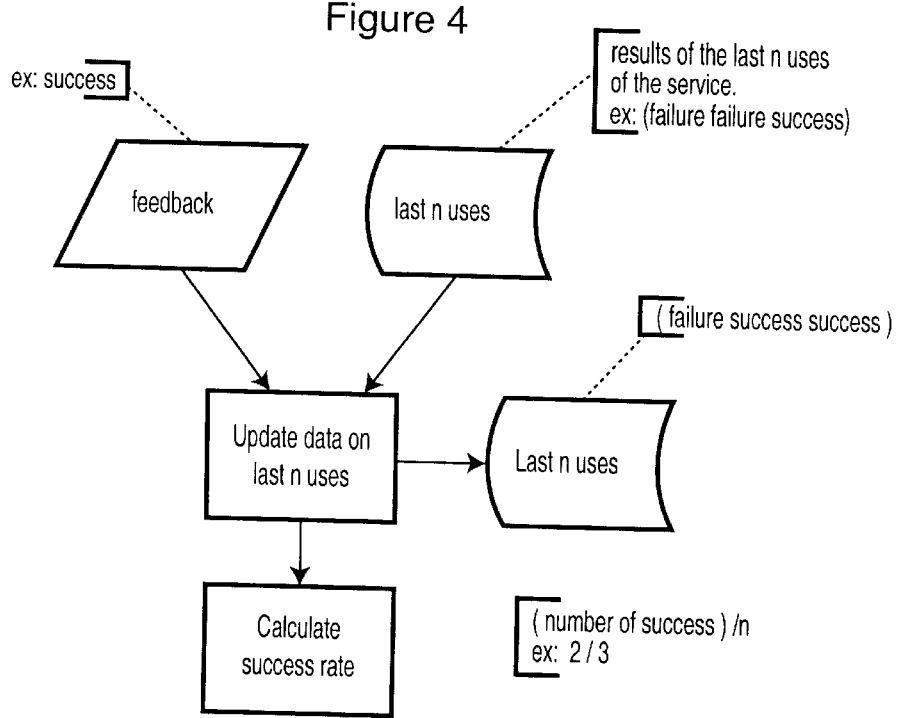
FIG. 4 is a flowchart showing the steps of a method for assessing QoS according to the present invention.
Figure 5:
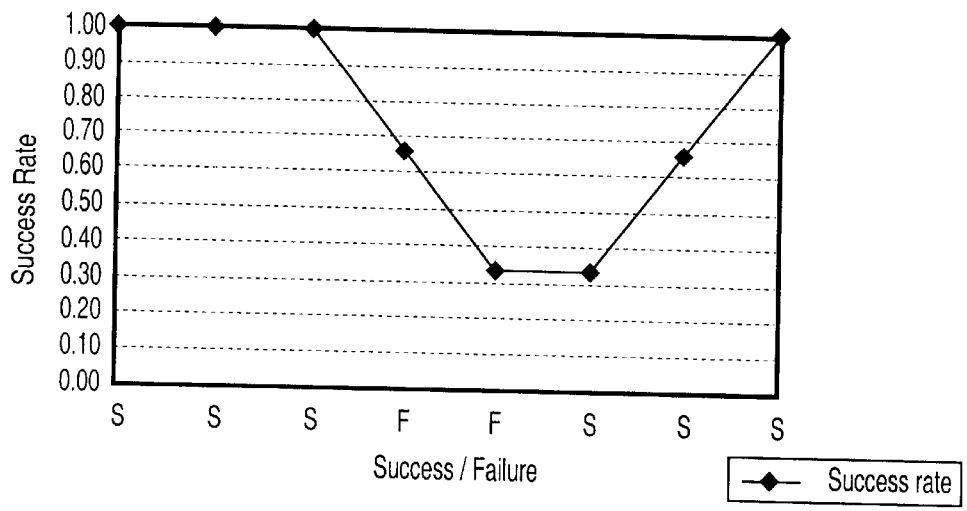
FIG. 5 shows a graph of Success Rate as a function of Success/Failure of an example service provided by a Bidder for the calculation of a bid.

FIG. 4 is a flowchart showing a simple method based on a sampling window of the last n uses of a service. This method is based on the realization that since the QoS can vary in time, it is not necessary to take into account all previous cases, and it is more important to know the current performance of the service. Thus, in the example shown in FIG. 4, if the most recent use of the service leads to a failure (i.e. the most recent usages go from two successes and a failure to two failures and only one success in the last n uses), the new success rate for the Bidder decreases from $2/3$ to $1/3$. An example of how the success rate can be calculated is shown in the graph of FIG. 5.

With respect to the second calculation (i.e. calculation of the bid), if the assessment of the QoS consists simply of a certain success rate, then it is easy to modify the value of the bid so that it takes QoS into account, as follows:

$$NewBid = Bid/Success\ Rate$$

where a lower Bid is considered to be better than a higher bid.

This simple calculation can either be performed by the Bidder or by the Bid Manager. If performed by the Bidder (which is only possible if the Bidder is part of the overall system, and is not provided by a third party, for reasons of trust), the Bid Manager has to chose the best (i.e. the lowest) bid, but also must provide feedback to the selected Bidder after its use of the service, as discussed above with reference to FIG. 3A. If the calculation is performed by the Bid Manager (thereby permitting the use of third-party Bidders), the Bid Manager monitors and stores the observed QoS of the selected Bidder in a database for future reference. Thus, in this scenario there is no requirement for the Bid Manager to provide feedback to the Bidder, as discussed above with reference to FIG. 3B.

Taking as an example the automatic route selection application set forth in U.S. Pat. No. 5,675,636, the assessing agent assumes the role of Bid Manager and the costing agents assume the role of Bidders. Consider a situation wherein there are two costing agents, A and B, one of which is to be selected by the assessing agent to route a long distance call. If agent A's bid is 10 cents per minute and agent B's bid is 12 cents per minute, but the assessing agent knows that while A and B behave similarly and in an acceptable manner for voice calls, A has failed 4 times in its last 10 data transmissions (thereby requiring wasteful and costly repeated calls for the same data session), whereas B has only failed once, the assessing agent recalculates the bids in the following way:

$$A\text{'s bid}:=10/(1-0.4)=16.67$$

$$B\text{'s bid}:=12/(1-0.1)=13.33$$

Since the discounted bid from agent B is less expensive, the assessing agent chooses B to provide the long distance service.

Assuming that B fails in this instance to provide the requested service, the assessing agent, having detected the failure as a semantic error, updates the success rate value of B. If, for example, the most recent previous failure of B was 6 calls previously, the assessing agent now knows that B has failed 2 times during the last 10 calls. This information is then used to discount the next bid received from agent B.

According to the alternative embodiment discussed above, the assessing agent relies on the costing agents to calculate their own failure rates, in which case the assessing agent provides each costing agent with feedback on its performance after each call, to assist the costing agent in calculating the new success rate for its next bid. As discussed above, this alternative is only viable where the costing agents are part of the system, and are not third party agents provided by the long distance carriers themselves.

The foregoing example may be represented using pseudo Java code, as follows:

```
BidderFeature code:
calculateBid()    {
    cost = getCostPerMinute(BillingPlan);
    cost := cost / getSuccessRate();
    return cost;
}
QoSResourceAdapter code:
//instance variables:
int successRate;
Queue lastncalls;
int N; //size of the queue
getSuccessRate()    {
    return successRate;
}
feedback(bool success)    {
//implementation of the flowchart
// storing only the success values of the last N calls
    lastncalls.push(success);
    lastncalls.pop;
    setSuccessRate();
}
setSuccessRate()    {
// count numbers of successes in the last N calls
    successes = count(lastncalls, true);
    successRate = successes / N;
}
```

On the Bid Manager's side the pseudo Java code is as follows:

```
BidderAgentAdapter code:
sendFeedback(Bidder bidder, bool success)    {
    if (call completed) send(bidder, true);
    else send(bidder, false);
}
getBidValue(bidder)    {
    send(bidder, callForBids);
    msg = recvFrom(bidder); //blocking
    return msg.bidValue;
}
```

In summary, a system is provided for automatically monitoring and learning the QoS of each Bidder and incorporating the QoS into the cost of the bids (i.e. a poor performance leads to a lesser value of the bid) for use in selecting a Bidder to provide a requested service, thereby extending the practical application of multi-agent bidding processes.

Alternatives and variations of the invention are possible. For example, although the example presented herein relates to bidding by costing agents to provide a long distance carrier server in an automatic route selection system, the principles of the invention have broad applications to many multi-agent systems where Bid Managers require the services of resources which are represented in the system by agents. For example, in a networking environment, a print manager agent may tender bids from competing print server agents, each representing a printer resource of the system. Or, an airline reservation agent may tender bids from several airline ticketing agents and discount the bids based on flight cancellations, departure delays, etc. All such applications are believed to be within the sphere and scope of the claims appended hereto.

What is claimed is:

1. A multi-agent system for selecting a service based on competing bids, comprising:

a Bid Manager agent for issuing a call for bids, receiving said bids and selecting a best bid from among said bids taking into consideration Quality of Service; and a plurality of Bidder agents for issuing said bids in response to said call for bids, wherein one of said Bidder agents issues said best bid and provides said service upon selection of said best bid by said Bid Manager;

wherein said Bid Manager provides feedback to said Bidders concerning said Quality of Service and each of said Bidders discounts its bid based on said Quality of Service feedback received from said Bid Manager; and wherein each one of said Bidder agents comprises a QoSResourceAdapter class for establishing an interface to access an APIof a resource for providing said service and calculating a success rate for said resource in providing said service based on the feedback from said Bid Manager; a ResourceManager class for managing and selecting said QoSResourceAdapter; and a BidderFeature class for accessing said success rate calculated by said QoSResourceAdapter class and in response calculating and issuing a bid to said Bid Manager and for receiving said feedback from said Bid Manager and forwarding said feedback to said QoSResourceAdapter class for use in calculating said success rate.

2. The multi-agent system of claim 1, wherein said Bid Manager further comprises a BidderAgentAdapter class for providing an interface for communicating with each of said Bidder agents; and a BidManagerFeature class for receiving said bids and selecting said best bid from among said bids received from said Bidders via said BidderAgentAdapter class and sending said feedback to said Bidders via said BidderAgentAdapter class.

3. A multi-agent system for selecting a service based on competing bids, comprising:
   a Bid Manager agent for issuing a call for bids, receiving said bids and selecting a best bid from among said bids taking into consideration Quality of Service; and
   a plurality of Bidder agents for issuing said bids in response to said call forbids; wherein one of said Bidder agents issues said best bid and provides said service upon selection of said best bid by said Bid Manager;
   wherein said Bid Manager assesses said Quality of Service for each of said Bidders for storage in a database, and discounts said bids based on said stored Quality of Service;
   wherein each one of said Bidder agents comprises a ResourceAdapter class for establishing an interface to access an API of a resource for providing said service; a ResourceManager class for managing and selecting said ResourceAdapter; and a BidderFeature class for calculating and issuing a bid to said Bid Manager; and
   wherein said Bid Manager further comprises a BidderAgentAdapter class for providing an interface for communicating with each of said Bidder agents; an Informant class for monitoring use and performance of said BidderAgentAdapter class; a ResourceManager class for consulting said Informant class; and a BidManagerFeature class for using said ResourceManager class and said BidderAgentAdapter class to receive said bids and selecting said best bid from among said bids based on said use and performance monitored by said Informant class.

* * * * *